United States Patent
Kinugawa

(10) Patent No.: US 9,536,500 B2
(45) Date of Patent: Jan. 3, 2017

(54) MAP DISPLAY DEVICE AND MAP DISPLAY SYSTEM

(71) Applicant: DENSO CORPORATION, Kariya, Aichi-pref. (JP)

(72) Inventor: Takaomi Kinugawa, Chiryu (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 14/429,381

(22) PCT Filed: Oct. 8, 2013

(86) PCT No.: PCT/JP2013/005999
§ 371 (c)(1),
(2) Date: Mar. 19, 2015

(87) PCT Pub. No.: WO2014/083744
PCT Pub. Date: Jun. 5, 2014

(65) Prior Publication Data
US 2015/0213785 A1    Jul. 30, 2015

(30) Foreign Application Priority Data

Nov. 27, 2012  (JP) .................................. 2012-258498

(51) Int. Cl.
*G09G 5/37*    (2006.01)
*G06T 3/40*    (2006.01)
(Continued)

(52) U.S. Cl.
CPC ............. *G09G 5/37* (2013.01); *G01C 21/3667* (2013.01); *G06T 3/40* (2013.01); *G09B 29/106* (2013.01);
(Continued)

(58) Field of Classification Search
None
See application file for complete search history.

(56) References Cited

U.S. PATENT DOCUMENTS 6,266,595 B1 * 7/2001 Greatline ............. A01B 79/005
                                                                340/990
9,311,726 B2 * 4/2016 Den Herder .......... G06T 11/206
(Continued)

FOREIGN PATENT DOCUMENTS

JP    2000-337894 A    12/2000
JP    2002-236019 A     8/2002
(Continued)

OTHER PUBLICATIONS

International Search Report and Written Opinion of the International Searching Authority mailed Nov. 12, 2013 in the corresponding International application No. PCT/JP2013/005999 (and English translation).

*Primary Examiner* — Zhengxi Liu
*Assistant Examiner* — Yanna Wu
(74) *Attorney, Agent, or Firm* — Posz Law Group, PLC

(57) ABSTRACT

A map display device includes: a processor that defines a coordinate system on a map including element polygons showing constituent elements of an urban map; a processor that sets coordinates located inside the element polygons as inner coordinates and sets coordinates located outside the element polygons as outer coordinates; a processor that calculates, for each coordinate in the coordinate system, a moving average value; a processor that resets each of the outer coordinates which has the moving average value larger than a predetermined value as the inner coordinate; a processor that sets, as an urban polygon, a polygon along an outer periphery of a region formed of an aggregate of the set and reset inner coordinates; and a processor that enables the urban map to be displayed when a current location is present inside the urban polygon.

6 Claims, 15 Drawing Sheets

(51) Int. Cl.
*G09B 29/10* (2006.01)
*G01C 21/36* (2006.01)

(52) U.S. Cl.
CPC ....... *G06T 2210/22* (2013.01); *G09G 2340/04* (2013.01); *G09G 2340/14* (2013.01); *G09G 2380/10* (2013.01)

(56) References Cited

U.S. PATENT DOCUMENTS

| | | | |
|---|---|---|---|
| 2005/0062763 A1* | 3/2005 | Keim | G09B 29/00 345/647 |
| 2006/0184317 A1* | 8/2006 | Asahara | G01C 21/3453 701/532 |
| 2007/0014488 A1* | 1/2007 | Chen | G06K 9/0063 382/294 |
| 2011/0176494 A1* | 7/2011 | Huang | G01S 5/02 370/329 |
| 2012/0066187 A1* | 3/2012 | Pearcy | G06Q 10/06 707/692 |

FOREIGN PATENT DOCUMENTS

| | | |
|---|---|---|
| JP | 2005-308877 A | 11/2005 |
| JP | 2007-121668 A | 5/2007 |
| JP | 2009-162484 A | 7/2009 |
| JP | 4782577 B2 | 9/2011 |

* cited by examiner

FIG. 5

$$B(\bar{x},\bar{y}) = \frac{\sum_{n=-\alpha}^{n=+\alpha} \sum_{m=-\alpha}^{m=+\alpha} B(x+m, y+n)}{(2\alpha+1)^2} \quad \cdots \quad (1)$$

$$B(\bar{x},\bar{y}) = \frac{\sum_{n=-\alpha}^{n=+\alpha} \sum_{m=-\alpha}^{m=+\alpha} B(x+m, y+n)}{2\alpha+1} \quad \cdots \quad (2)$$

MAP DISPLAY DEVICE AND MAP DISPLAY SYSTEM

CROSS REFERENCE TO RELATED APPLICATION

The present disclosure is a U.S. national stage application of International Patent Application No. PCT/JP2013/005999 filed on Oct. 8, 2013 and is based on Japanese Patent Application No. 2012-258498 filed on Nov. 27, 2012, the disclosure of which is incorporated herein by reference.

TECHNICAL FIELD

The present disclosure relates to a map display device and a map display system.

BACKGROUND

For example, Patent Literature 1 discloses a navigation apparatus, which is mounted in a vehicle (referred to as a host vehicle) and sets in map data a polygon that encloses a region where an urban map is present. The urban map is enabled to be displayed when the location (host vehicle location) of the host vehicle is present inside the polygon region; in contrast, the urban map is disabled from being displayed when the host vehicle location is present outside the polygon region. Such an urban map can be referred to also as street directory and includes buildings and sites facing streets as constituent elements.

PATENT LITERATURE

Patent Literature 1: JP 2000-337894 A

The polygon (hereinafter referred to as an "urban polygon") enclosing the region where the urban map is present needs to be updated in such a case as when map data is organized and the urban map is newly edited. If such an updating process is manually performed by the producer of the map data or the user of the navigation apparatus, enormous labor is required and, in addition, a human error is likely to occur.

SUMMARY

It is an object of the present disclosure to provide a map display device and a map display system which enable an urban polygon to be automatically updated with high precision without depending on human manipulation.

A map display apparatus and a map display system according to an aspect of the present disclosure each are provided as follows. A coordinate system is defined on a map including element polygons showing constituent elements of an urban map. Coordinates located inside the element polygons are set as inner coordinates; coordinates located outside the element polygons are set as outer coordinates. For each coordinate in the coordinate system, a moving average value is calculated by using a predetermined window width. Each of the outer coordinates which has the moving average value larger than a predetermined value is reset as the inner coordinate. A polygon is set as an urban polygon to be along an outer periphery of a region formed of an aggregate of the inner coordinates that have been set and the inner coordinate that has been reset. The urban map is enabled to be displayed when a current location is present inside the urban polygon.

That is, the above-described map display device and the map display system each permit an urban polygon to be automatically set on the basis of an aggregated region formed of an aggregate of the inner coordinates set inside the element polygons and the inner coordinates resulting from conversion of outer coordinates based on moving average values. In addition, since the aggregated region formed of the aggregate of the inner coordinates includes the element polygons corresponding to the constituent elements of an urban map, a high-precision urban polygon adequate to the configuration of the urban map can be set on the basis of the aggregated region. This enables to automatically update the urban polygon with high precision without depending on human manipulation.

BRIEF DESCRIPTION OF DRAWINGS

The above and other objects, features and advantages of the present disclosure will become more apparent from the following detailed description made with reference to the accompanying drawings. In the drawings:

FIG. 5 is a diagram showing examples of expressions for calculating a moving average value;

DETAILED DESCRIPTION

Figure 1:
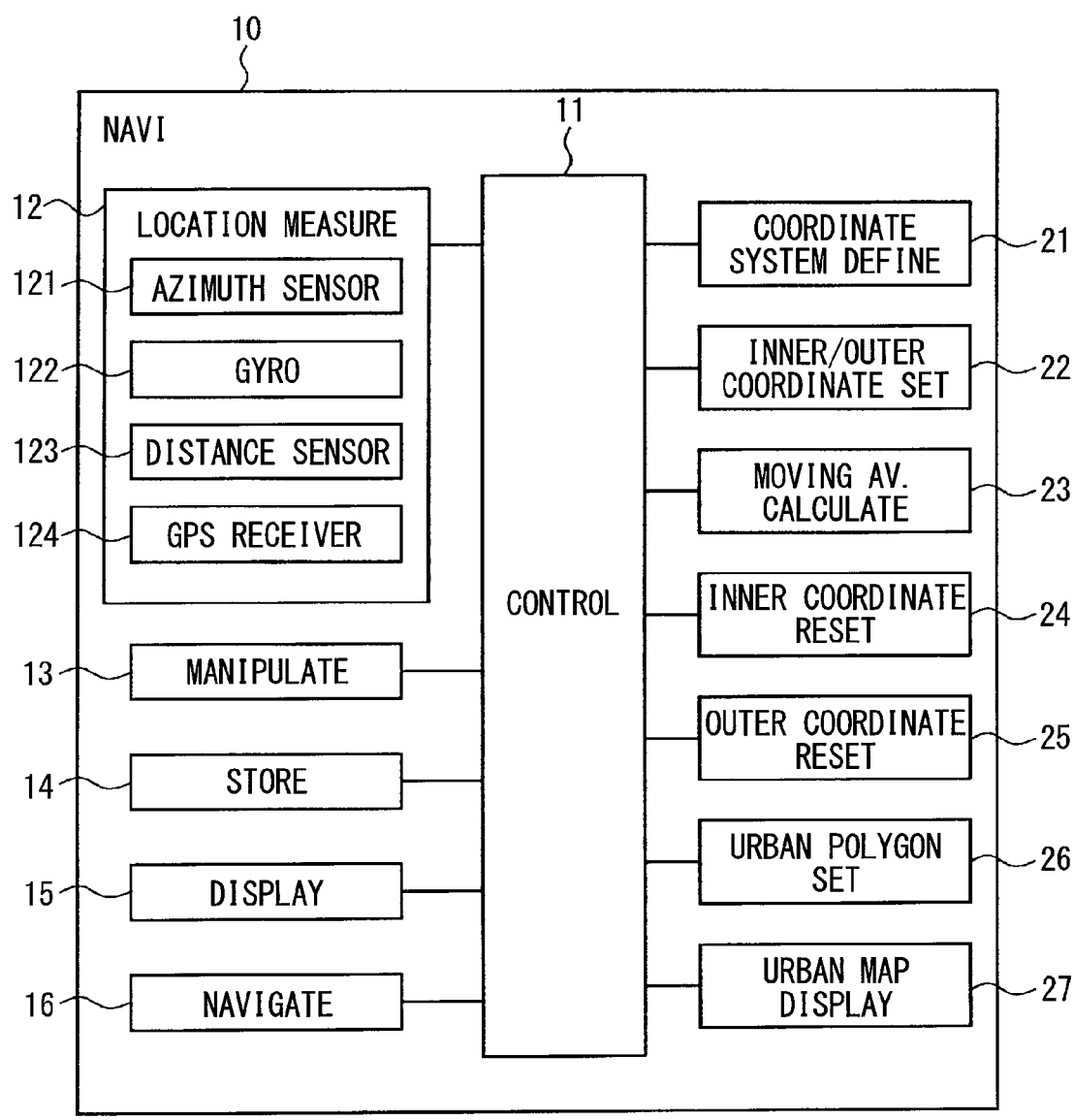
FIG. 1 is a functional block diagram schematically showing a configuration of a navigation apparatus according to a first embodiment.

The following will describe the plurality of embodiments of the present disclosure with reference to the drawings. Note that components which are substantially the same in each of the embodiments are designated by the same reference numerals and a description thereof is omitted.

First Embodiment

A navigation apparatus 10 shown in FIG. 1 corresponds to a map display device which displays a map on the basis of map data. The navigation apparatus 10 includes a control unit 11, a location measurement unit 12, a manipulation unit 13, a storage unit 14, a display unit 15, and a navigating unit 16. The control unit 11 is referred to also as a control circuit 11 and formed mainly of a microcomputer having a CPU, a ROM, or a RAM unshown to control the general operation of the navigation apparatus 10. The control unit 11 also executes a control program in the CPU to virtually implement a coordinate system definition processor 21, an inner and outer coordinate setting processor 22, a moving average calculation processor 23, an inner coordinate resetting processor 24, an outer coordinate resetting processor 25, an urban polygon setting processor 26, and an urban map display processor 27 using software. Note that these processors 21 to 27 may also be implemented as an integrated circuit integral with the control unit 11 using hardware.

The location measurement unit 12 measures the current location of a vehicle (referred to as a host vehicle or a subject vehicle) in which the navigation apparatus 10 is mounted, i.e., a host vehicle location, and outputs locational information showing the measured host vehicle location to the control unit 11. The location measurement unit 12 includes various detection means such as an azimuth sensor 121, a gyro sensor 122, a distance sensor 123, and a satellite wave receiver 124. The azimuth sensor 121 detects the azimuth of the vehicle. The gyro sensor 122 detects the rotation angle of the vehicle. The distance sensor 123 detects the running distance of the vehicle. The satellite wave receiver 124 receives the electric wave transmitted from a positioning satellite unshown so as to measure the current location of the vehicle using a positioning system. The location measurement unit 12 measures the host vehicle location on the basis of detection values from the azimuth sensor 121, the gyro sensor 122, the distance sensor 123, and the satellite wave receiver 124.

The manipulation unit 13 includes a mechanical switch provided in the vicinity of the screen of the display unit 15 and the touch panel switch provided on the screen of the display unit 15. The user uses each of the switches of the manipulation unit 13 to input various commands for performing, e.g., the setting of a destination in route guidance, the switching of the configuration of the display screen of the display unit 15 or the display output mode, the changing of the reduction rate of a map to be displayed, the selection of a menu screen, the retrieval of a route, the initiation of the rooting guidance, the correction of a current location, and the adjustment of a sound volume. The navigation apparatus 10 operates on the basis of the input command.

The storage unit 14 is formed of a storage medium such as a detachable flash memory card or a hard disk drive. The storage unit 14 stores various data such as map data and information to be updatable. The map data includes various data such as road data formed of a plurality of nodes forming roads and links connecting the individual nodes, coordinate data showing a location on the map, map matching data for assigning the host vehicle location onto a road, table data for reflecting traffic information on road data, and other data including background data, land mark data, and destination data.

Figure 2:
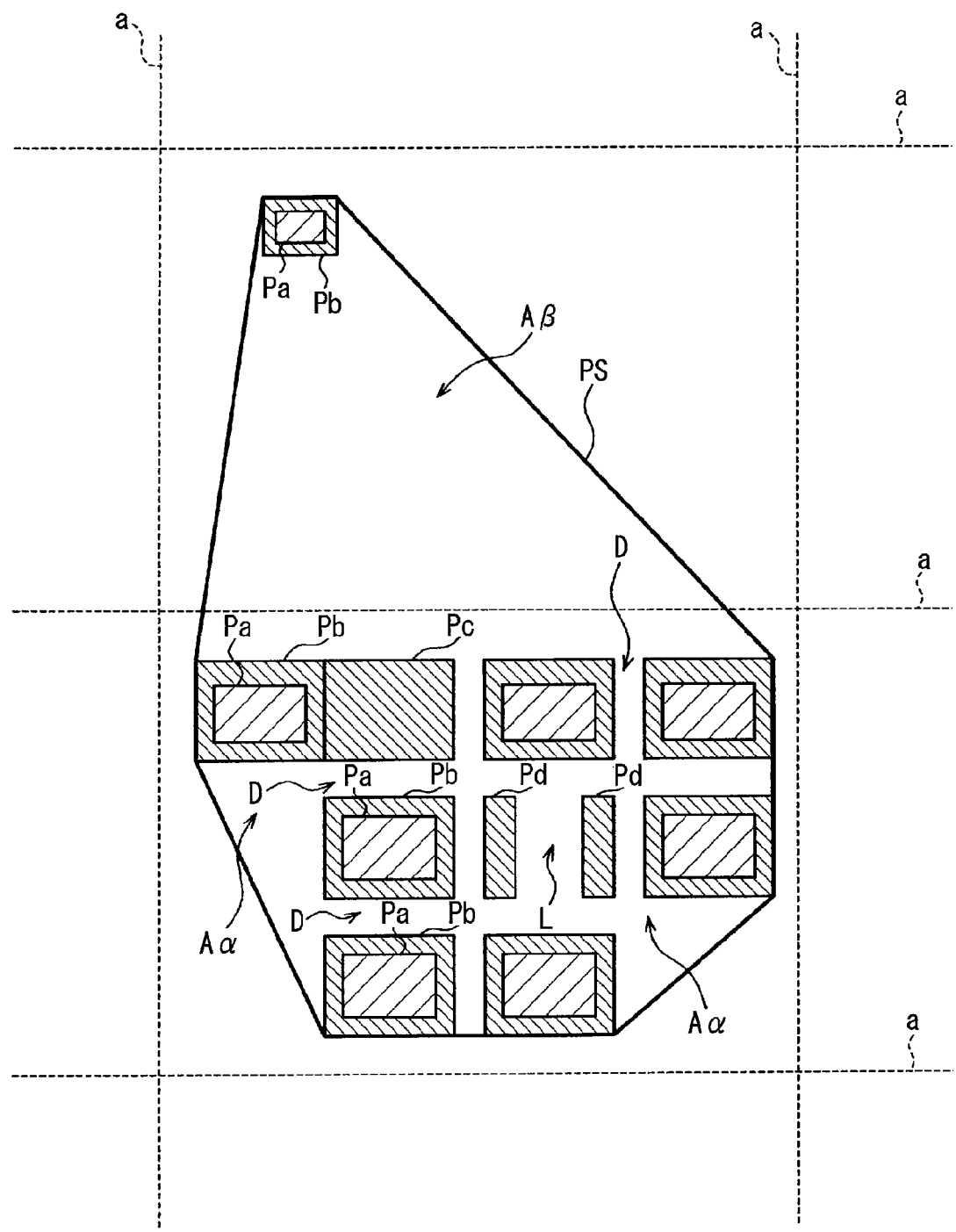
FIG. 2 is a view visually showing map data including element polygons showing constituent elements of an urban map.

As shown in FIG. 2, the map data is divided into a plurality of compartments as shown by the broken lines a and includes element polygons P (element polygon data) showing the constituent elements of the urban map. The urban map can be referred to also as street directory and has buildings and sites facing streets as the constituent elements. Examples of the element polygons P serving as the constituent elements forming the urban map include a building polygon Pa showing a building, a site polygon Pb showing a site, a park polygon Pc showing a park, and a green space polygon Pd showing a green space. The element polygons P are designed to be updated to those showing a latest urban map configuration as a result of the updating of the map data on the basis of data distributed from, e.g., a map data distribution server not shown. Note that the constituent polygons P are not set to the portions corresponding to the roads D and vacant spaces L each included in the urban map, i.e., portions having no constituent element.

The map data also includes an urban polygon PS (urban polygon data) as a polygon enclosing the region where the urban map including the plurality of element polygons P is present. The urban polygon PS can automatically be updated, i.e., reset by an urban polygon automatic setting process described later in detail. Note that the urban polygon PS shown in FIG. 2 includes regions Aα and Aβ where the element polygons P are not present; namely, regions Aα and Aβ should not be included in the urban map to be displayed. The region Aα is a region where no element polygon is present in the compartment in which data on the urban map is prepared. The region Aβ is a region where no element polygon is present in the compartment in which data on the urban map is not prepared. The navigation apparatus 10 performs an urban map display process when the host vehicle location is present inside the urban polygon. Such an urban polygon PS thus causes the urban map display process to be undesirably performed even when the host vehicle location is present in the region Aα or Aα that is placed outside an urban area.

Figure 11:
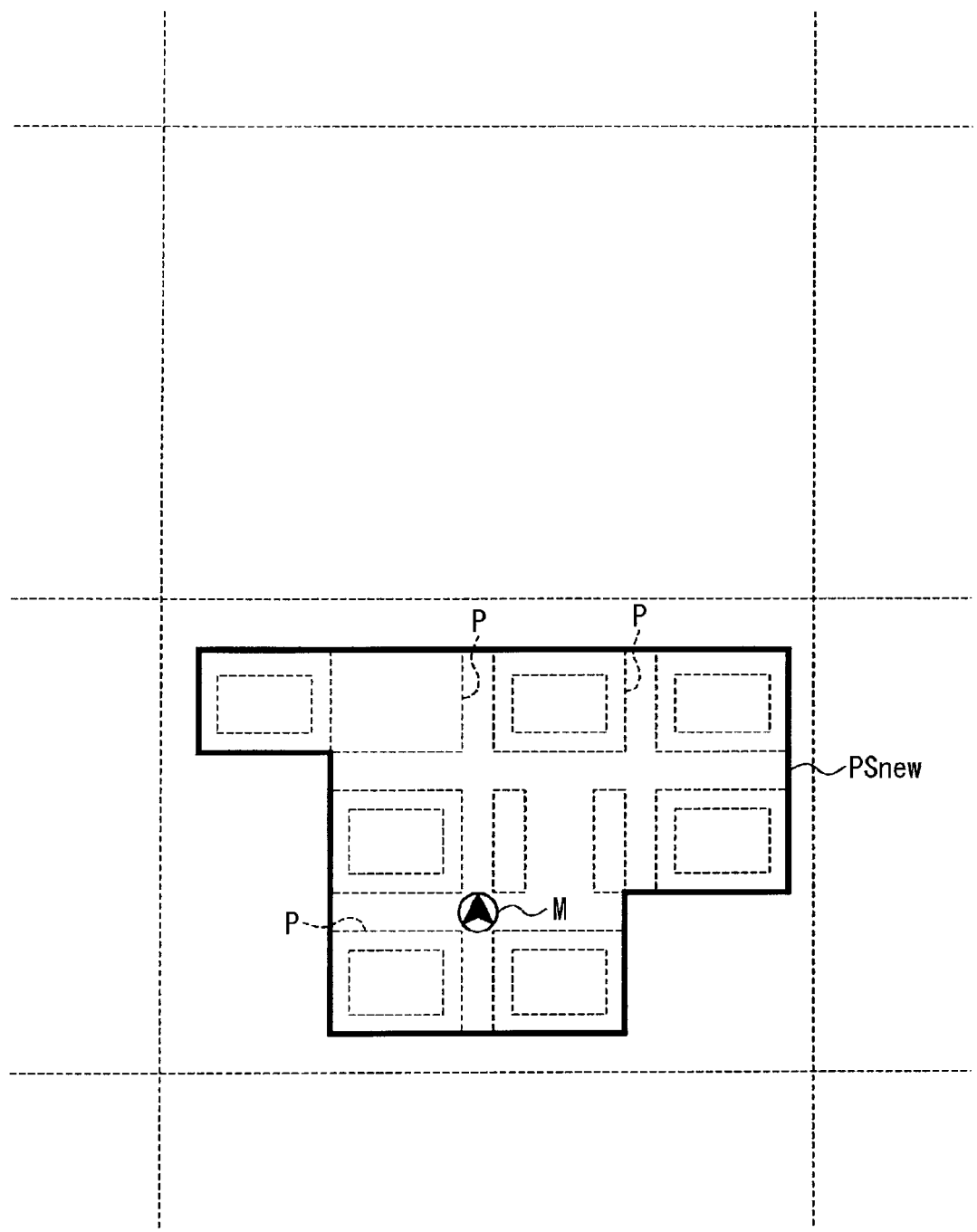
FIG. 11 is a view showing a state where a host vehicle location is present inside the urban polygon.
Figure 12:
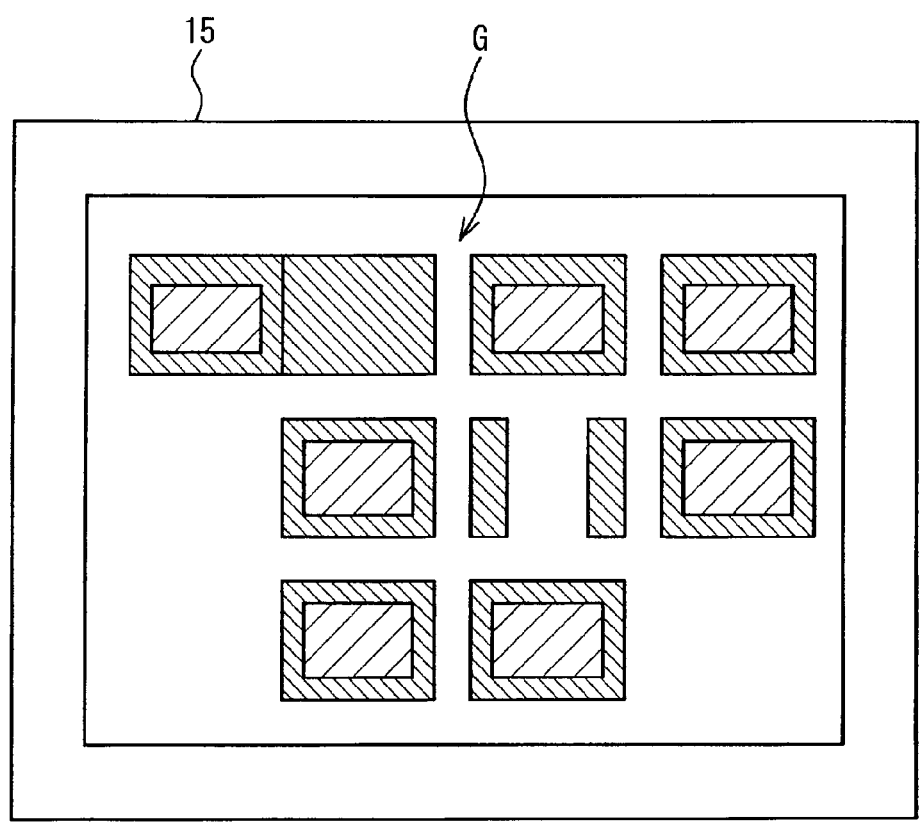
FIG. 12 is a view showing a state where an urban map is displayed on a display unit.

The display unit 15 is formed of, e.g., a liquid crystal or organic EL color display. On the screen of the display unit 15, a map of the surroundings of the host vehicle location can be displayed at various reduction rates on the basis of the map data. Also, on the screen of the display unit 15, a current location mark M (see FIG. 11) showing the host vehicle location and the direction of travel of the vehicle is displayed to be superimposed on the displayed map. In the case of performing route guidance to a destination, a screen for route guidance is displayed on the screen of the display unit 15. Also, on the screen of the display unit 15, as will be described later in detail, an urban map G (see FIG. 12) can be displayed on the basis of the element polygons P.

The navigating unit 16 includes a guidance route retrieving processor which retrieves a guidance route for the vehicle and a map data reading processor which reads the map data. The navigating unit 16 performs route guidance for the vehicle on the basis of the retrieved guidance route and map data.

Figure 3:
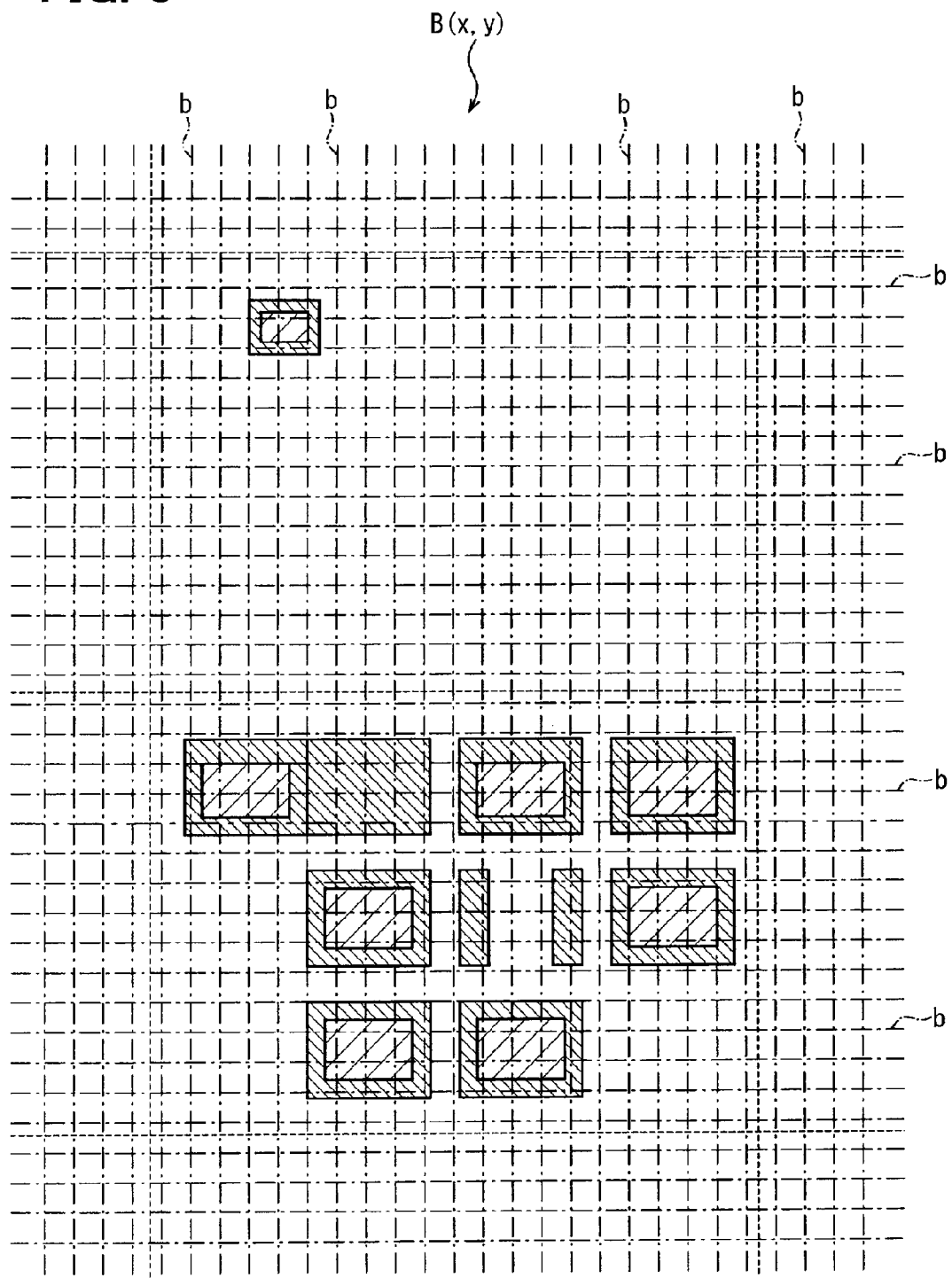
FIG. 3 is a view visually showing a state where a coordinate system is defined on a map.

The coordinate system definition processor 21 corresponds to a coordinate system definition section, device, or means. As shown in, e.g., FIG. 3, the coordinate system definition processor 21 defines an arbitrary coordinate system B (x,y) on a map which can be displayed on the basis of the map data, i.e., map including the element polygons P showing the constituent elements of the urban map. The coordinate system B(x,y) is defined irrelevantly to the partitions set in the map data. Note that the present embodiment provides as an example the arbitrary coordinate system B (x,y) using a "coordinate" having an x coordinate and a y coordinate; thus, a "coordinate" may be also referred to as a "coordinate-set" or a "coordinate-pair." The accuracy of the coordinate system B(x,y) can be adjusted appropriately in accordance with, e.g., the processing performance of the control unit 11. For example, when the processing performance of the control unit 11 is high, a denser coordinate system, i.e., the coordinate system B(x,y) having a larger number of coordinates can be defined. When the processing performance of the control unit 11 is low, a thinner coordinate system, i.e., the coordinate system B(x,y) having a smaller number of coordinates can be defined. Note that the coordinates forming the coordinate system B(x,y) are present not only at the intersection points between the grid lines b shown in FIG. 3, but also at many points between the individual grid lines b. The coordinate system B(x,y) may also be defined in association with the partitions set in the map data.

Figure 4:
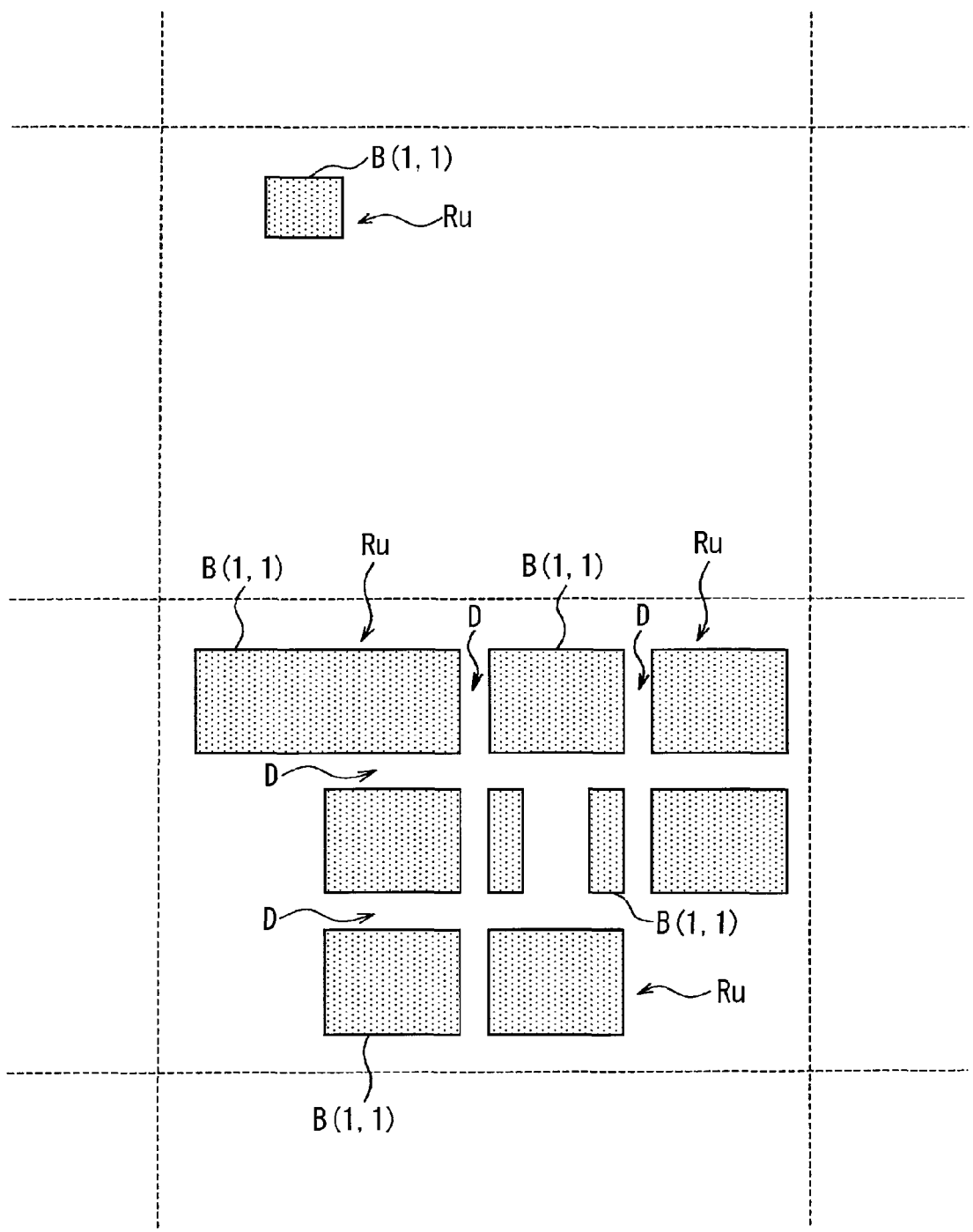
FIG. 4 is a view visually showing a state where inner coordinates and outer coordinates are set in the coordinate system.

The inner and outer coordinate setting processor 22 corresponds to an inner and outer coordinate setting section, device, or means. As shown in FIG. 4, in the coordinate system B, the coordinates located inside the element polygons P are set as inner coordinates B(1,1) and the coordinates located outside the element polygons P are set as outer coordinates B(0,0). Note that, in FIG. 4, for the convenience of the description, the coordinates set as the inner coordinates B(1,1) are shown by being shaded, while the coordinates set as the outer coordinates B(0,0) are shown without being shaded.

The moving average calculation processor 23 calculates, using a predetermined window width H, a moving average value for each of the coordinates in the coordinate system B on the basis of, e.g., the expression (1) or (2) shown in FIG. 5. That is, the moving average calculation processor 23 calculates the respective moving average values for the individual coordinates using H coordinate values present around each of the coordinates. In this case, the window width H is set as "2α+1." The moving average calculation processor 23 specifies the road having a largest road width among the roads D included in the urban map and sets the road width of the specified road, i.e., the maximum value of the road widths as a value "α" defining the window width H. That is, the moving average calculation unit 23 sets the window width H on the basis of the road widths of the roads included in the urban map. Note that the value "α" may be set, e.g., as an average value of the road widths of the roads included in the urban map.

Figure 6:
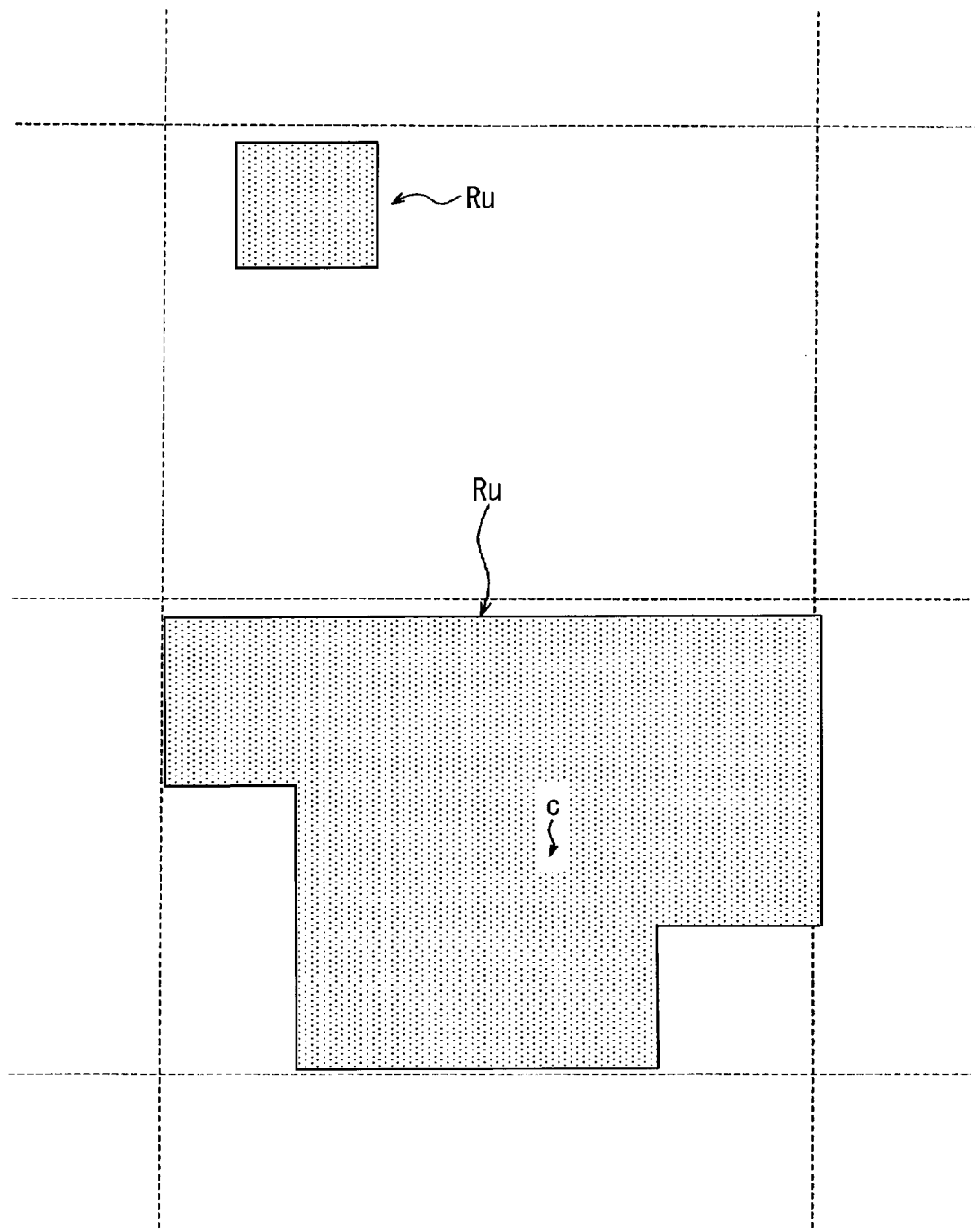
FIG. 6 is a view visually showing a state where any one of outer coordinates which has a moving average value larger than a predetermined value is reset as an inner coordinate.

The inner coordinate resetting processor 24 corresponds to an inner coordinate resetting section, device, or means. The inner coordinate resetting processor 24 resets each of the outer coordinates B(0,0) which has the moving average value larger than a predetermined value T(0,0) as the inner coordinate B(1,1). In other words, the inner coordinate resetting processor 24 converts the outer coordinate B(0,0) having the moving average value larger than the predetermined value T(0,0) to the inner coordinate B(0,0). In this case, the window width H is set on the basis of the maximum value α of the road widths of the roads included in the urban map and, as the predetermined value T, T(0,0) has been set. As a result, in FIG. 4, among the outer coordinates B(0,0) present around a region (hereinafter referred to as "inner region Ru") formed of an aggregate of the inner coordinates B(1,1), all the coordinates present within the range extending from the outer periphery of the inner region Ru by a distance corresponding to the maximum value α of the road widths have the moving average values larger than the predetermined value T(0,0). Accordingly, these outer coordinates B(0,0) are all reset (converted) as/to the inner coordinates B(0,0). Thus, all the outer coordinates B(0,0) present on the roads D shown in FIG. 4 are converted to the inner coordinates B(1,1) and, as shown in FIG. 6, the inner region Ru is enlarged by dimensions each corresponding to the maximum value α of the road widths.

Figure 7:
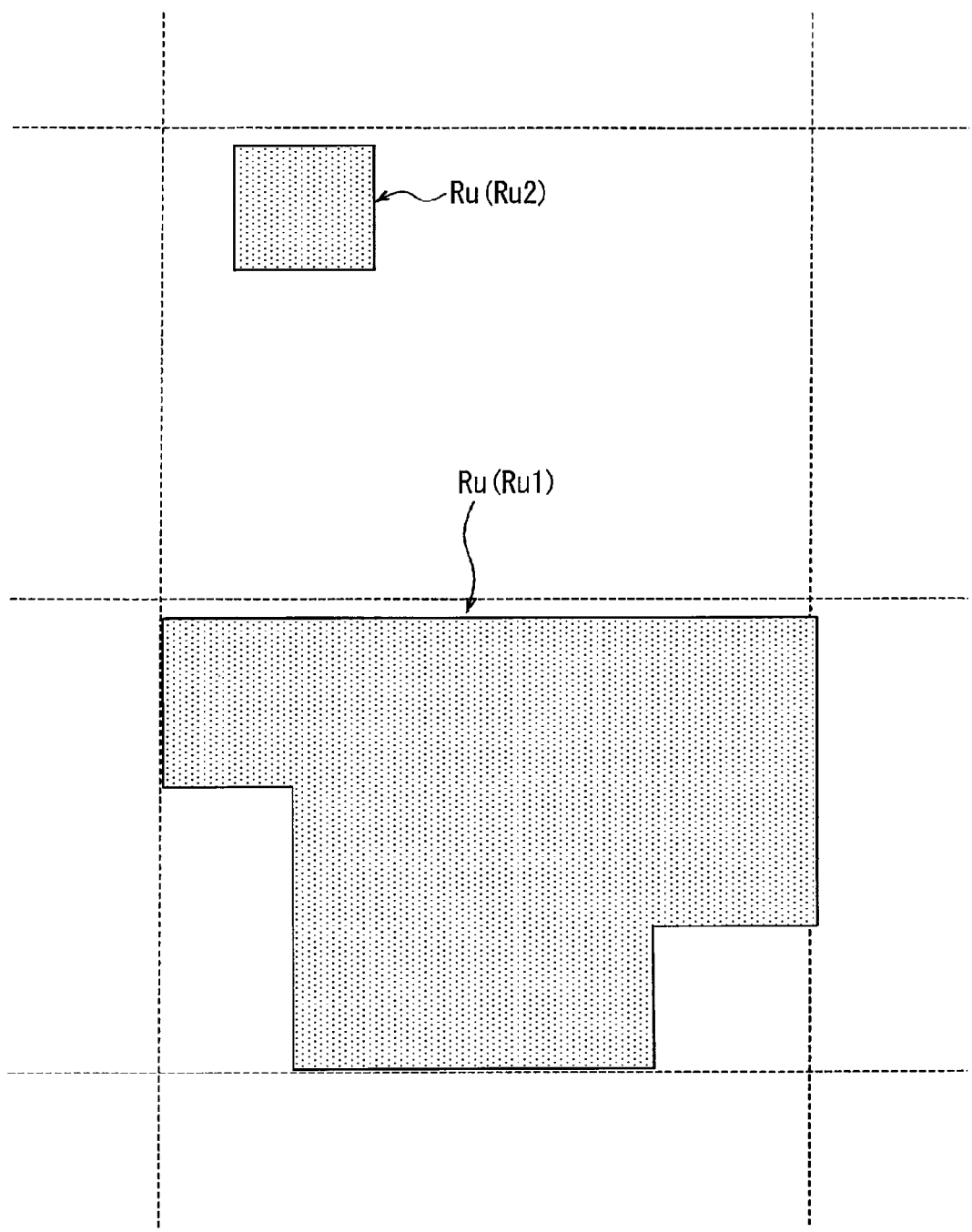
FIG. 7 is a view visually showing a state where the outer coordinate surrounded by the inner coordinates is reset as an inner coordinate.

Then, the inner coordinate resetting processor 24 further resets (converts) each of the outer coordinates B(0,0) surrounded by the inner coordinates B(1,1) as (to) the inner coordinate B(1,1). Thus, the outer coordinate B(0,0) present in, e.g., the region shown by the reference mark c in FIG. 6 is converted to the inner coordinate B(1,1), as shown in FIG. 7. As a result, inside the inner region Ru, the coordinates B(0,0) and a region (hereinafter referred to as "outer region Rs") including an aggregate of the outer coordinates B(0,0) no longer exist. Note that, in this case, the region shown by the reference mark c corresponds to the outer region Rs.

Figure 8:
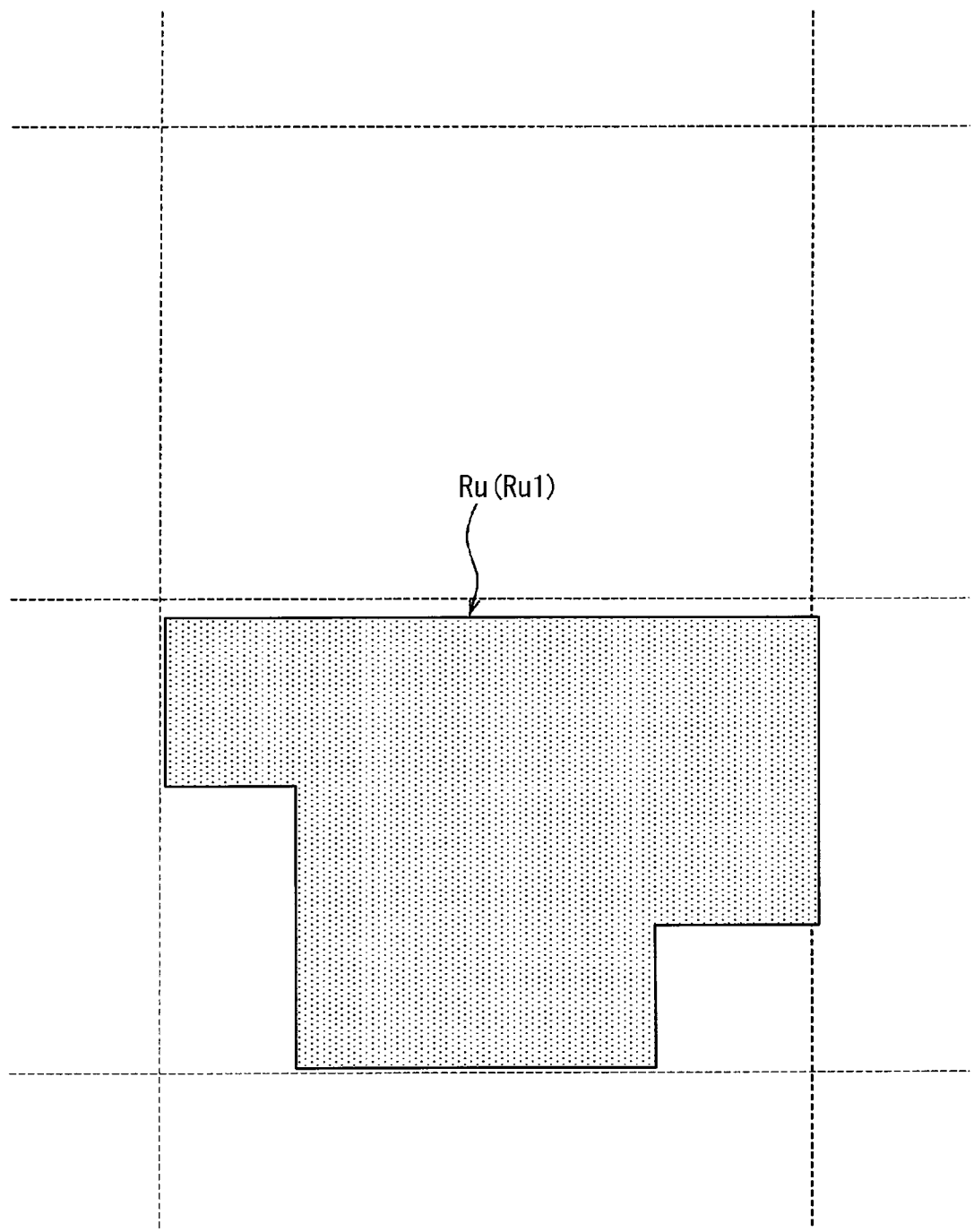
FIG. 8 is a view visually showing a state where the inner coordinate included in a region smaller than a predetermined area is reset as an outer coordinate.

The outer coordinate resetting processor 25 corresponds to an outer coordinate resetting section, device, or means. After the processing by the inner coordinate resetting processor 24, when there are a plurality of the inner regions Ru as shown in FIG. 7, the outer coordinate resetting processor 25 resets (converts) each of the inner coordinates B(1,1) included in each of the plurality of inner regions Ru1 and Ru2 which has an area smaller than a predetermined area S as (to) the outer coordinate B(0,0). As a result, e.g., the inner region Ru2 shown in FIG. 7, i.e., the inner region having an area smaller than the predetermined area S is eliminated, as shown in FIG. 8. On the other hand, the inner region Ru1 shown in FIG. 7, i.e., the inner region having an area larger than the predetermined area S is left without being eliminated, as shown in FIG. 8. The predetermined area S can be changed and set appropriately in accordance with, e.g., the size of the urban polygon normally assumed or the size of the screen of the display unit 15. Note that the processing by the outer coordinate resetting processor 25 may also be set to be performed prior to the processing by the inner coordinate resetting processor 24.

Figure 9:
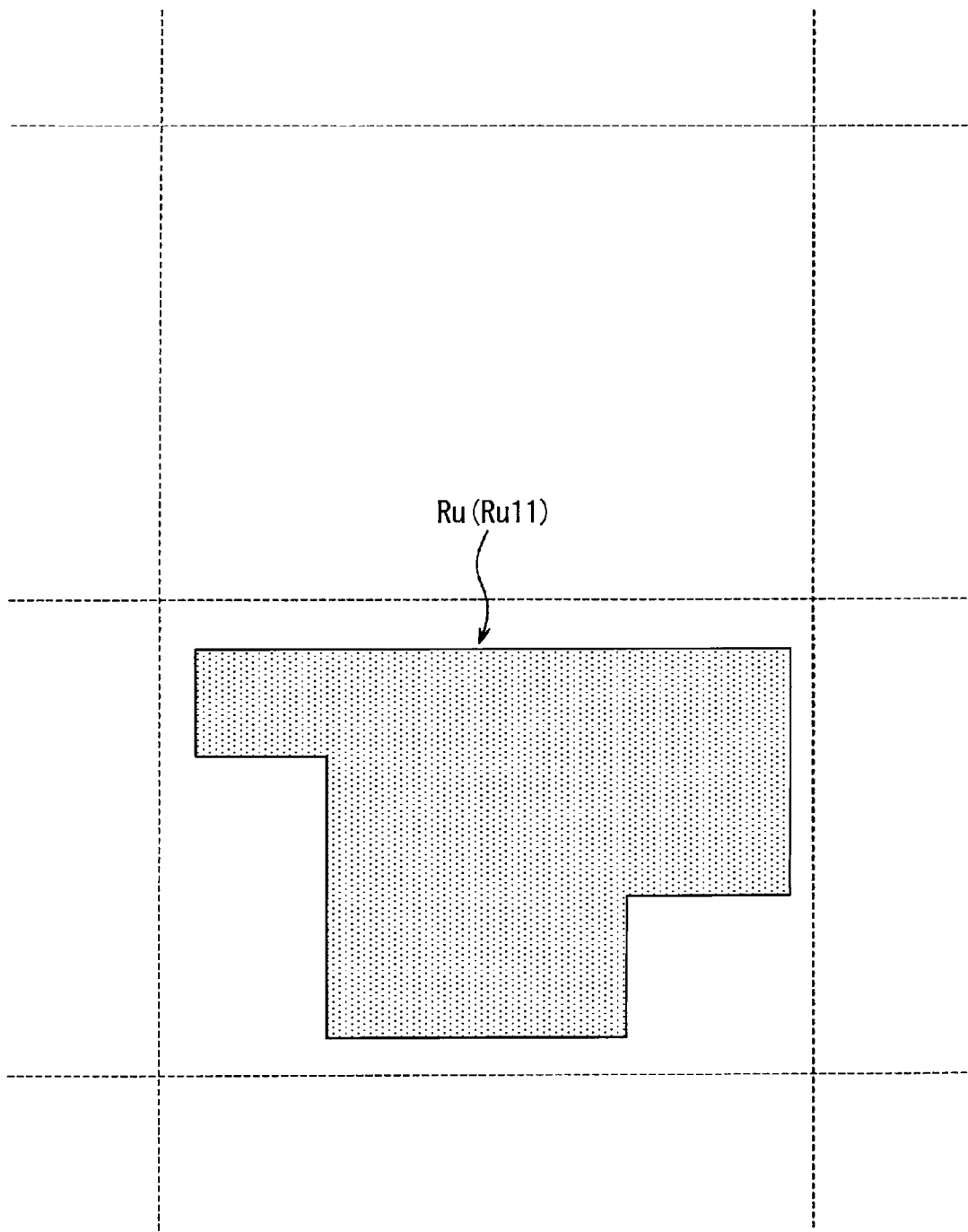
FIG. 9 is a view visually showing a state where the inner region is reduced by dimensions each corresponding to the maximum value of road widths.
Figure 10:
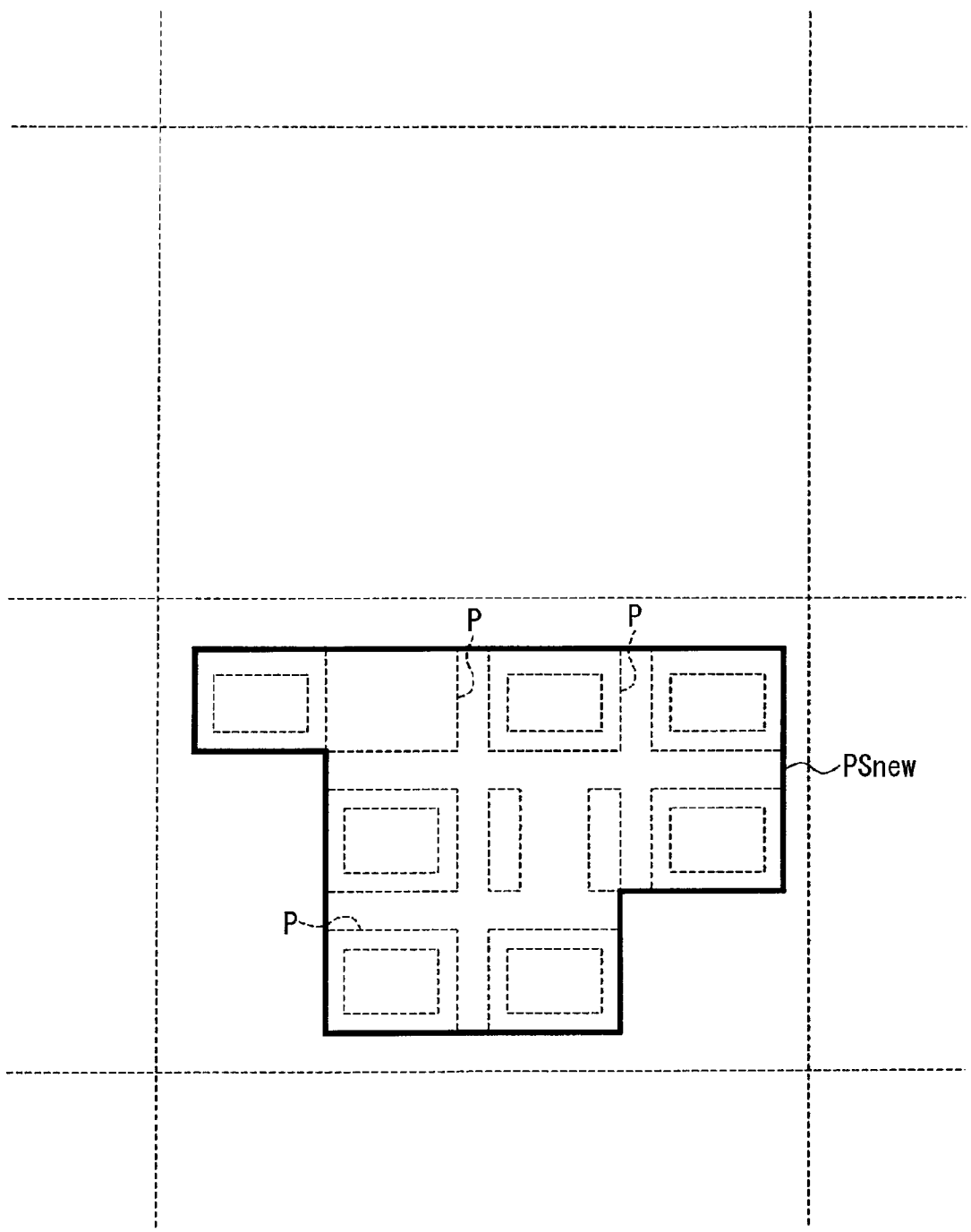
FIG. 10 is a view visually showing a state where a polygon along the outer periphery of the inner region is set as an urban polygon.

The urban polygon setting processor 26 corresponds to an urban polygon setting section, device, or means. The urban polygon setting processor 26 sets, as a new urban polygon PSnew, a polygon along the outer periphery of the inner region Ru formed of an aggregate of the inner coordinates B(1,1) that have been set by the inner and outer coordinate setting processor 22 and the inner coordinate B(1,1) that has been reset by the inner coordinate resetting processor 24. In this case, prior to setting the new urban polygon, the urban polygon setting processor 26 reduces the inner region Ru1 shown in FIG. 8 by dimensions each corresponding to the maximum value α of the road widths to provide an inner region Ru11, as shown in FIG. 9. Then, as shown in FIG. 10, the urban polygon setting processor 26 sets, as the new urban polygon PSnew, a polygon along the outer periphery of the reduced inner region Ru11. Note that FIG. 10 virtually shows the element polygons P included in the urban polygon PSnew by the broken lines. The urban polygon PSnew thus set is along the outer periphery of an aggregate of the group of element polygons P forming one urban map. Unlike the urban polygon PS, the urban polygon PSnew does not include the regions Aα and Aβ where the urban map should not be displayed.

The urban map display processor 27 corresponds to an urban map display section, device, or means. When the host vehicle location is present inside the urban polygon PSnew, the urban map display processor 27 enables the urban map to be displayed. That is, as shown in, e.g., FIG. 11, when the host vehicle location (current location mark M) is present inside the urban polygon PSnew, the urban map display processor 27 displays an urban map display button as a touch button on the screen of the display unit 15. Then, when the urban map display button is manipulated, the map display processor 27 displays the urban map G on the screen of the display unit 15 on the basis of the element polygons P included in the urban polygon PSnew. On the other hand, when the host vehicle location is present outside the urban polygon PSnew, the urban map display processor 27 disables the urban map from being displayed. That is, the urban map display processor 27 has been configured so as not to display the urban map display button on the screen of the display unit 15 when the host vehicle location is present outside the urban polygon PSnew.

Next, a description of the content of the urban polygon automatic setting process performed by the navigation apparatus 10 will be given.

It is noted that a flowchart or the processing of the flowchart in the present application includes sections (also referred to as steps), each of which is represented, for instance, as A1 or B1. Further, each section can be divided into several sub-sections while several sections can be combined into a single section. Furthermore, each of thus configured sections can be also referred to as a processor, device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 13:
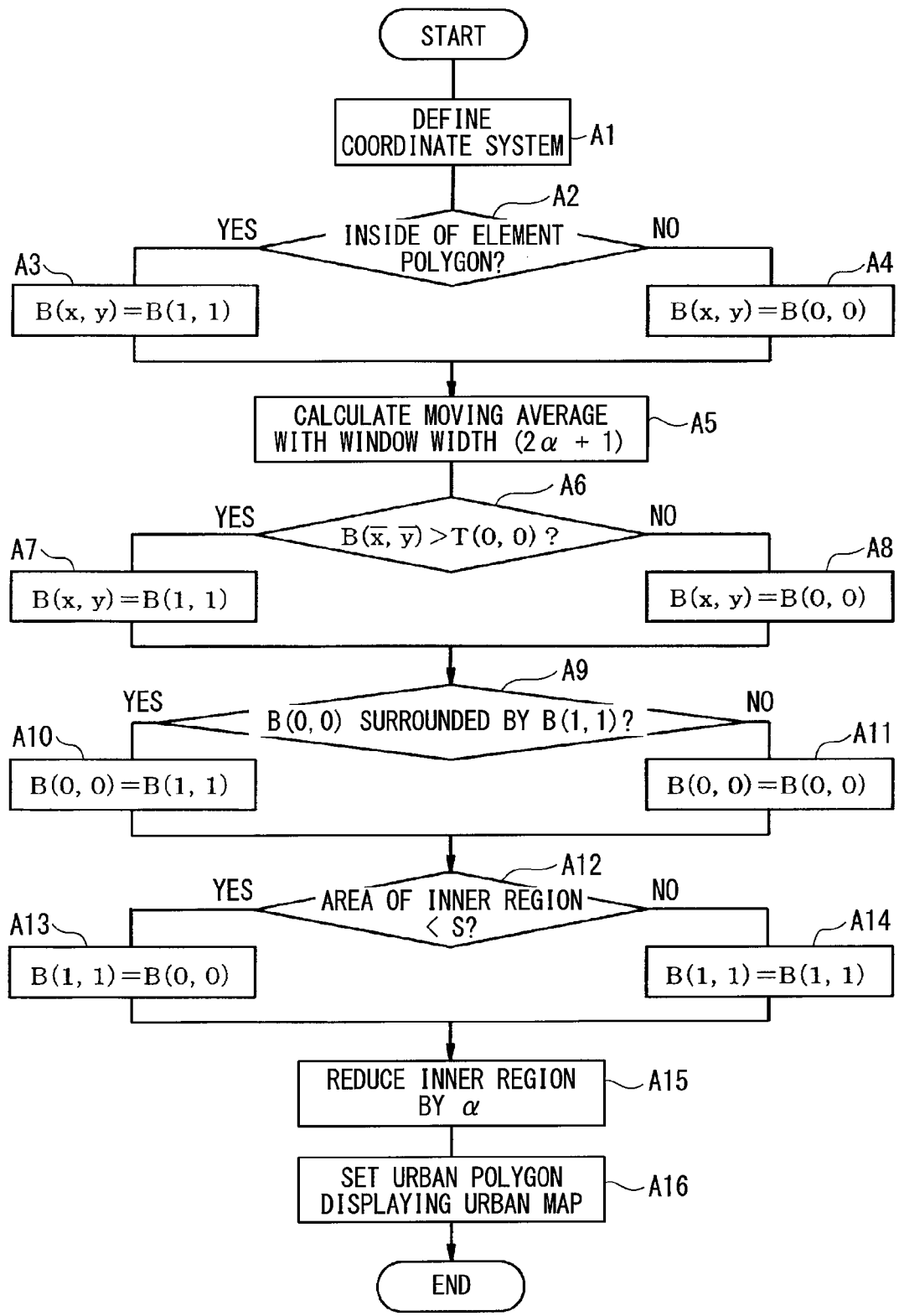
FIG. 13 is a flowchart illustrating an urban polygon automatic setting process.

That is, as shown in FIG. 13, on initiating the process, the navigation apparatus 10 newly defines the coordinate system B used for the present process on a map (A1). Then, the navigation apparatus 10 determines whether or not each of the coordinates in the coordinate system B is located inside the element polygon P (A2).

When determining that a coordinate is located inside the element polygon P (A2: YES), the navigation apparatus 10 sets the coordinate as the inner coordinate $B(1,1)$ (A3). When determining that a coordinate is located outside the element polygon P (A2: NO), the navigation apparatus 10 sets the coordinate as the outer coordinate $B(0,0)$ (A4).

Next, the navigation apparatus 10 calculates, for each of the coordinates set as the inner coordinate $B(1,1)$ or the outer coordinate $B(0,0)$, a moving average value using the window width H $(2\alpha+1)$ (A5). Then, the navigation apparatus 10 determines whether or not the moving average value of each of the coordinates is larger than the predetermined value $T(0,0)$ (A6). When determining that the moving average value of a coordinate is larger than the predetermined value $T(0,0)$ (A6: YES), the navigation apparatus 10 sets the coordinate as the inner coordinate $B(1,1)$ (A7). When determining that the moving average value of a coordinate is smaller than the predetermined value $T(0,0)$ (A6: NO), the navigation apparatus 10 sets the coordinate as the outer coordinate $B(0,0)$ (A8). Thus, each of the outer coordinates $B(0,0)$ which has the moving average value larger than the predetermined value $T(0,0)$ is reset as the inner coordinate $B(1,1)$. For example, the outer coordinate $B(0,0)$ present on the road D is converted to the inner coordinate $B(1,1)$.

Next, the navigation apparatus 10 determines whether or not each of the remaining outer coordinates $B(0,0)$ is surrounded by the inner coordinates $B(1,1)$ (A9). When determining that an outer coordinate $B(0,0)$ is surrounded by the inner coordinates $B(1,1)$ (A9: YES), the navigation apparatus 10 resets the outer coordinate $B(0,0)$ as the inner coordinate $B(1,1)$ (A10). When determining that an outer coordinate $B(0,0)$ is not surrounded by the inner coordinates $B(1,1)$ (A9: NO), the navigation apparatus 10 holds the outer coordinate $B(0,0)$ as the outer coordinate $B(0,0)$ (A11). Thus, the outer region Rs present inside the inner region Ru is eliminated to provide a state where none of the inner regions Ru includes the outer coordinates $B(0,0)$.

Next, when there are the plurality of inner regions Ru, the navigation apparatus 10 determines whether or not the area of each of the inner regions Ru is smaller than the predetermined area S (A12). Then, when determining that the area of an inner region Ru is smaller than the predetermined area S (A12: YES), the navigation apparatus 10 resets each of the inner coordinates $B(1,1)$ included in the inner region Ru as the outer coordinate $B(0,0)$ (A13). When determining that the area of an inner region Ru is larger than the predetermined area S (A12: NO), the navigation apparatus 10 holds each of the inner coordinates $B(1,1)$ included in the inner region Ru as the inner coordinate $B(1,1)$ (A14). Thus, the inner region Ru having the area smaller than the predetermined area S is eliminated.

Next, the navigation apparatus 10 reduces each of the inner regions Ru remaining without being eliminated by dimensions each corresponding to the value "$\alpha$" defining the window width H (A15). Then, the navigation apparatus 10 sets a polygon along the outer periphery of the reduced inner region Ru as the new urban polygon PSnew, i.e., urban polygon which does not include a region where the urban map should not be displayed (A16).

Figure 14:
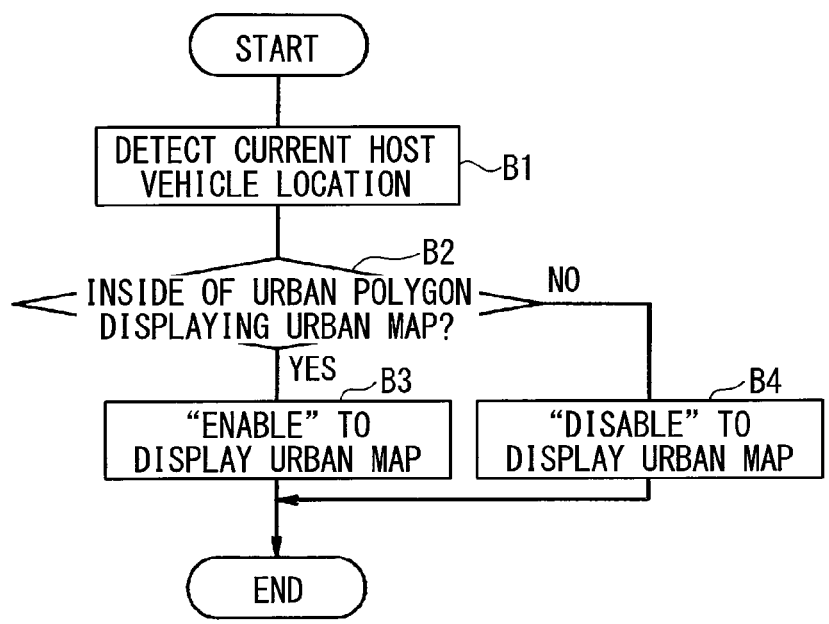
FIG. 14 is a flowchart illustrating an urban-map display/non-display setting process.

Next, a description of the content of an urban-map display/non-display setting process performed by the navigation apparatus 10 will be given. The process sets the display/non-display of the urban map on the basis of the locational relationship between the host vehicle location and the urban polygon PSnew. That is, as shown in FIG. 14, on detecting the current host vehicle location (B1), the navigation apparatus 10 determines whether or not the host vehicle location is present inside the urban polygon PSnew (B2). When the host vehicle location is present inside the urban polygon PSnew (B2: YES), the navigation apparatus 10 displays, e.g., the urban map display button to enable the urban map to be displayed (B3). When the host vehicle location is present outside the urban polygon PSnew (B2: NO), the navigation apparatus 10 does not display, e.g., the urban map display button to disable the urban map from being displayed (B4).

The above-described navigation apparatus 10 allows the new urban polygon PSnew to be automatically set on the basis of an aggregated region formed of an aggregate of the inner coordinates $B(1,1)$ set inside the element polygons P and coordinates resulting from conversion of the outer coordinates $B(0,0)$ to the inner coordinates $B(1,1)$ based on the moving average value, i.e., the inner region Ru. Since the inner region Ru includes the element polygons P corresponding to the constituent elements of the urban map, the high-precision urban polygon PSnew adequate to the configuration of the urban map can be set on the basis of the inner region Ru. This enables to automatically update the urban polygon with high precision without depending on human manipulation.

The navigation apparatus 10 also sets the window width H in the process of calculating the moving average value, i.e., a data number used to calculate the moving average on the basis of the road widths of the roads included in the urban map. This enables to reliably convert the outer coordinates $B(0,0)$ present on the roads included in the urban map to the inner coordinates $B(1,1)$ while enabling the resulting inner coordinates B(1,1) to be included in the inner region Ru. This allows even the road to which the element polygon P has not been set to be included in the new urban polygon PSnew.

The navigation apparatus 10 further resets each of the outer coordinates B(0,0) surrounded by the inner coordinates B(1,1) as the inner coordinate B(1,1). This enables even the outer coordinate B(0,0) present in the portion of the urban map to which the element polygon has not been set, such as a vacant space L, to be converted to the inner coordinate B(1,1) and enables the resulting inner coordinate B(1,1) to be included in the inner region Ru. Accordingly, even when there is a region which is to be included in the urban map but to which the element polygon P has not been set, the region is enabled to be included in the new urban polygon PSnew.

The navigation apparatus 10 also reduces each of the inner regions Ru by dimensions each corresponding to the road width a and sets the polygon along the outer periphery of the reduced region as the new urban polygon PSnew. Accordingly, even when the inner region Ru is enlarged by the process of calculating the moving average value, the new urban polygon PSnew can be set on the basis of the inner region Ru in which the enlarged portion has been cancelled out. This enables to generate the high-precision urban polygon adequate to the configuration of the urban map.

The urban polygon PS shown in FIG. 2 includes the region Aβ by being affected by the element polygons P locally present in the region where the map data has not been completely prepared. Therefore, the urban polygon PS shown in FIG. 2 is inadequate to the configuration of the urban map. In contrast, the navigation apparatus 10 in the present embodiment is configured as follows. Supposing that a plurality of inner regions Ru are included and a subject inner region Ru of the plurality of inner regions has an area smaller than the predetermined area S, the inner coordinate B(1,1) included in the subject inner region Ru is reset as the outer coordinate B(0,0). Accordingly, the urban polygon can be prevented from being set on the basis of the inner region Ru having an area smaller than the predetermined area S. As a result, even when, e.g., the element polygons P are locally present in the region where the map data has not been completely prepared, the urban polygon PSnew can be generated without being affected by the element polygons P and the region where the urban map should not be displayed can be prevented from being included in the new urban polygon PSnew.

Second Embodiment

Figure 15:
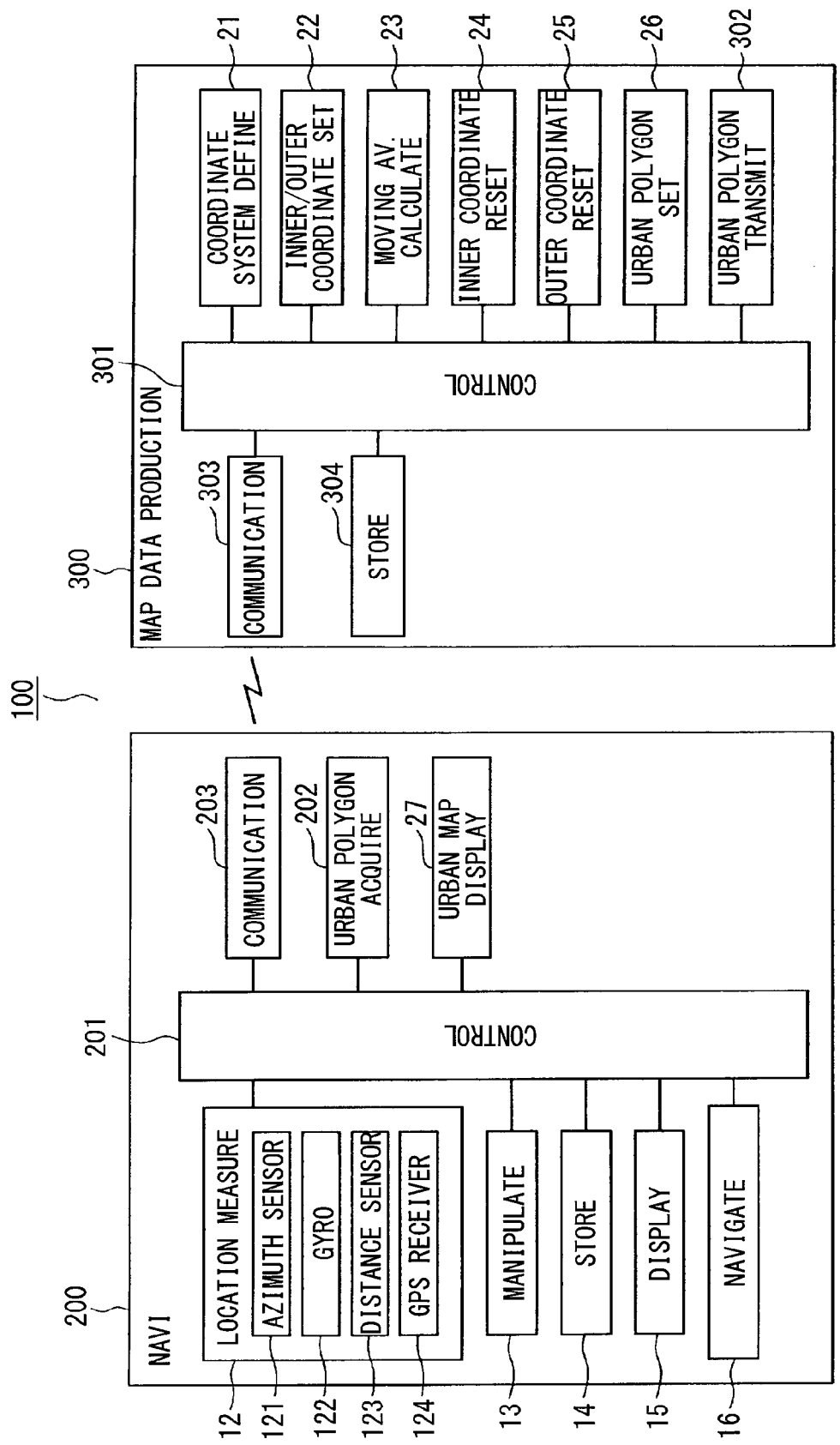
FIG. 15 is a functional block diagram schematically showing a configuration of a map display system according to a second embodiment.

A map display system 100 shown in FIG. 15 includes a navigation apparatus 200 and a map data production apparatus 300.

The map data production apparatus 300 produces map data and includes a control unit 301 (referred to also as a control circuit 301) controlling the general operation of the map data production apparatus 300. The control unit 301 executing a control program virtually implements each of the coordinate system definition processor 21, the inner and outer coordinate setting processor 22, the moving average calculation processor 23, the inner coordinate resetting processor 24, the outer coordinate resetting processor 25, the urban polygon setting processor 26, and an urban polygon transmission processor 302, using software. Note that each of these processors 21 to 26 and 302 may also be implemented as, e.g., an integrated circuit integral with the control unit 301 using hardware.

The coordinate system definition processor 21, the inner and outer coordinate setting processor 22, the moving average calculation processor 23, the inner coordinate resetting processor 24, the outer coordinate resetting processor 25, and the urban polygon setting processor 26 are the same as shown in the foregoing embodiment. A storage unit 304 updatably stores various data such as map data and information, similarly to the storage unit 14 in the navigation apparatus 200. The urban polygon transmission processor 302 transmits the urban polygon (urban polygon data) set by the urban polygon setting processor 26 to the navigation apparatus 200 via a communication unit 303. Note that the communication unit 303 is formed of, e.g., a wireless communication module to establish a communication line to the navigation apparatus 200.

The navigation apparatus 200 corresponding to a map display device includes a control unit 201 controlling the general operation of the navigation apparatus 200. The control unit 201 executing a control program virtually implements an urban polygon acquisition processor 202 and the urban map display processor 27, using software. Note that these processors 27 and 202 may also be implemented as, e.g., an integrated circuit integral with the control unit 201 using hardware.

The urban polygon acquisition processor 202 corresponds to an urban polygon acquisition section, device, or means. The urban polygon acquisition processor 202 receives the urban polygon (urban polygon data) transmitted from the map data production apparatus 300 via a communication unit 203. Thus, the urban polygon acquisition processor 202 acquires the urban polygon set by the urban polygon setting processor 26 in the map data production apparatus 300. Note that the communication unit 203 is formed of, e.g., a wireless communication module to establish a communication line to the map data production apparatus 300. The urban map display processor 27 is the same as shown in the foregoing embodiment.

The map display system 100 allows the urban polygon to be automatically updated with high precision without depending on human manipulation. That is, the present disclosure may also be configured to perform an urban polygon automatic setting process in an external map data production apparatus to produce map data including the latest urban polygon and provide the map data to the map display device. Note that the map display device and the map data production apparatus may also be connected via a wired communication cable.

Other Embodiments

The present disclosure is not limited to each of the above-described embodiments and is applicable to various embodiments within a range not departing from the gist of the present disclosure. For example, the present disclosure is applicable not only to a navigation apparatus mounted in a vehicle, but also to a mobile communication terminal having a navigation function. In this case, the "host vehicle location" may be replaced appropriately with the current location of the mobile communication terminal measured by a location measurement unit included in the mobile communication terminal. Also, the map display device or the map display system may be configured appropriately to automatically perform the urban polygon automatic setting process every time the map data held by the map display device or the map display system is updated.

It is understood that the present disclosure has been described in accordance to the examples, but the present disclosure is not limited to the structure and the embodiment. The present disclosure also encompasses variations in the equivalent range as various modifications. In addition, embodiments and various combinations, and further, only one element thereof, less or more, and the form and other combinations including, are intended to fall inside the spirit and scope of the present disclosure.

The invention claimed is:

1. A map display device, comprising:
    a coordinate system definition section that defines a coordinate system on a map including element polygons showing constituent elements of an urban map;
    an inner and outer coordinate setting section that sets, as inner coordinates, coordinates located inside the element polygons and sets, as outer coordinates, coordinates located outside the element polygons;
    a moving average calculation section that calculates, for each coordinate in the coordinate system, a moving average value by using a predetermined window width,
    wherein the moving average of value for each coordinate in the coordinate system is calculated on the basis of one of the following expressions;

$$B(\bar{x}, \bar{y}) = \frac{\sum_{n=-\alpha}^{n=+\alpha} \sum_{m=-\alpha}^{m=+\alpha} B(x+m, y+n)}{(2\alpha+1)^2} \quad (1)$$

$$B(\bar{x}, \bar{y}) = \frac{\sum_{n=-\alpha}^{n=+\alpha} \sum_{m=-\alpha}^{m=+\alpha} B(x+m, y+n)}{2\alpha+1} \quad (2)$$

wherein B(x,y) is assigned a first predetermined status value when (x,y) is located inside the element polygons, B(x,y) is assigned a second predetermined status value when (x,y) is located outside the element polygons, the value of α is a representative road width, and the value of predetermined window width is 2α+1;
    an inner coordinate resetting section that resets, as an inner coordinate, each of the outer coordinates which has the moving average value larger than a predetermined value;
    an urban polygon setting section that sets, as an urban polygon, a polygon along an outer periphery of a region formed of an aggregate of the inner coordinates that have been set by the inner and outer coordinate setting section and the inner coordinate that has been reset by the inner coordinate resetting section; and
    an urban map display section that enables the urban map to be displayed when a current location is present inside the urban polygon.

2. The map display device according to claim 1, wherein the moving average calculation section sets the window width based on a road width of a road included in the urban map.

3. The map display device according to claim 1, wherein the inner coordinate resetting section further resets, as an inner coordinate, the outer coordinate surrounded by the inner coordinates.

4. The map display device according to claim 1, wherein the urban polygon setting section reduces the region formed of the aggregate of the inner coordinates by a dimension corresponding to a road width and
    sets, as the urban polygon, a polygon along the outer periphery of the reduced region.

5. The map display device according to claim 1, further comprising:
    an outer coordinate resetting section that resets, when there are a plurality of the regions each formed of the aggregate of the inner coordinates, each of the inner coordinates included in each of the plurality of regions which has an area smaller than a predetermined area as an outer coordinate.

6. A map display system including a map display device that displays a map based on map data and a map data preparation apparatus that displays the map data,
    the map data preparation apparatus comprising:
    a coordinate system definition section that defines a coordinate system on a map including element polygons showing constituent elements of an urban map;
    an inner and outer coordinate setting section that
        sets, as inner coordinates, coordinates located inside the element polygons and sets, as outer coordinates, coordinates located outside the element polygons;
    a moving average calculation section that calculates, for each coordinate in the coordinate system, a moving average value by using a predetermined window width,
    wherein the moving average of value for each coordinate in the coordinate system is calculated on the basis of one of the following expressions;

$$B(\bar{x}, \bar{y}) = \frac{\sum_{n=-\alpha}^{n=+\alpha} \sum_{m=-\alpha}^{m=+\alpha} B(x+m, y+n)}{(2\alpha+1)^2} \quad (1)$$

$$B(\bar{x}, \bar{y}) = \frac{\sum_{n=-\alpha}^{n=+\alpha} \sum_{m=-\alpha}^{m=+\alpha} B(x+m, y+n)}{2\alpha+1} \quad (2)$$

wherein B(x,y) is assigned a first predetermined status value when (x,y) is located inside the element polygons, B(x,y) is assigned a second predetermined status value when (x,y) is located outside the element polygons, the value of α is a representative road width, and the value of predetermined window width is 2α+1;
    an inner coordinate resetting section that resets, as an inner coordinate, each of the outer coordinates which has the moving average value larger than a predetermined value; and
    an urban polygon setting section that sets, as an urban polygon, a polygon along an outer periphery of a region formed of an aggregate of the inner coordinates that have been set by the inner and outer coordinate setting section and the inner coordinate that has been reset by the inner coordinate resetting section,
    the map display device comprising:
    an urban polygon acquisition section that acquires the urban polygon set by the urban polygon setting section; and
    an urban map display section that enables the urban map to be displayed when a current location is present inside the urban polygon.

* * * * *